US012730512B2

(12) United States Patent
Shishido

(10) Patent No.: US 12,730,512 B2
(45) Date of Patent: Sep. 8, 2026

(54) TACTILE SENSATION GENERATION DEVICE, TACTILE SENSATION GENERATION METHOD, AND NON-TRANSITORY COMPUTER-READABLE MEDIUM

(71) Applicant: JVCKENWOOD Corporation, Yokohama (JP)

(72) Inventor: Tomoyuki Shishido, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 262 days.

(21) Appl. No.: 18/595,835

(22) Filed: Mar. 5, 2024

(65) Prior Publication Data

US 2024/0201786 A1 Jun. 20, 2024

Related U.S. Application Data

(63) Continuation of application No. PCT/JP2022/021406, filed on May 25, 2022.

(30) Foreign Application Priority Data

Sep. 17, 2021 (JP) ................................ 2021-151790

(51) Int. Cl.
*G06F 3/01* (2006.01)

(52) U.S. Cl.
CPC .............. *G06F 3/016* (2013.01); *G06F 3/014* (2013.01)

(58) Field of Classification Search
None
See application file for complete search history.

(56) References Cited

U.S. PATENT DOCUMENTS 11,093,035 B1 * 8/2021 Ng .......................... G06F 3/016
12,405,211 B2 * 9/2025 Connor ................ A61B 5/0077

(Continued)

FOREIGN PATENT DOCUMENTS

JP 2008-129835 A 6/2008
JP 2016126766 A 7/2016
WO 2007114225 A1 10/2007

OTHER PUBLICATIONS

International Search Report and Written Opinion of PCT/JP2022/021406, dated Jul. 26, 2022.

(Continued)

*Primary Examiner* — Toan H Vu
(74) *Attorney, Agent, or Firm* — PROCOPIO, CORY, HARGREAVES & SAVITCH LLP

(57) ABSTRACT

In one embodiment, a device includes a posture information generation unit configured to generate posture information representing a posture of a wearing part of a wearer of a vibration element, a fluid direction information acquisition unit configured to acquire fluid direction information representing a direction of a flow of a fluid in a virtual space and fluid speed information representing a speed of the fluid flow in the virtual space, a comparison unit configured to compare the posture information with the fluid direction information, and a vibration control unit configured to control vibration of the vibration element based on a result of a comparison by the comparison unit. After the vibration control unit calculates a time difference based on the fluid speed information and vibrates a first vibration element, the vibration control unit vibrates a second vibration element spaced apart from the first vibration element, with the time difference.

4 Claims, 13 Drawing Sheets

(56) References Cited

U.S. PATENT DOCUMENTS

| | | | | |
|---|---|---|---|---|
| 2016/0189493 | A1 | 6/2016 | Rihn et al. | |
| 2019/0113966 | A1* | 4/2019 | Connellan | G01C 21/1656 |
| 2021/0169417 | A1* | 6/2021 | Burton | A61B 5/4857 |
| 2022/0125217 | A1* | 4/2022 | Connor | A47C 27/061 |
| 2022/0409437 | A1* | 12/2022 | Pamplin | A61F 13/08 |
| 2023/0029639 | A1* | 2/2023 | Ghosh Roy | A61B 5/01 |
| 2024/0075202 | A1* | 3/2024 | Fridez | A61B 5/14865 |
| 2024/0099934 | A1* | 3/2024 | Stanfield | A41D 13/12 |
| 2024/0161438 | A1* | 5/2024 | Nakagawa | G06F 3/011 |

OTHER PUBLICATIONS

Yano et al., “Haptization of Flow Field Using Vibroglove,” Feb. 15, 1999, Transactions of the Information Processing Society of Japan, vol. 40, No. 2., pp. 414-421.

* cited by examiner

| KIND OF WIND (WIND SPEED) | OSCILLATION | VIBRATION FREQUENCY | TEMPERATURE LOWERING |
| --- | --- | --- | --- |
| (1) BREEZE (LESS THAN 3 m/s) | VERY SMALL | INTERMEDIATE | 0° C OR MORE TO LESS THAN 3° C |
| (2) SLIGHTLY STRONG WIND (3 m/s OR MORE TO LESS THAN 7 m/s) | SMALL | INTERMEDIATE | 3° C OR MORE TO LESS THAN 7° C |
| (3) STRONG WIND (7 m/s OR MORE TO LESS THAN 10 m/s) | INTERMEDIATE | HIGH | 7° C OR MORE TO LESS THAN 10° C |
| (4) VIOLENT WIND (10 m/s OR MORE) | LARGE | HIGH | 10° C OR MORE |

Fig. 2B

| WIND DIRECTION | REGION L | REGION F | REGION R |
| --- | --- | --- | --- |
| WL | STRONG | WEAK | OFF |
| WR | OFF | WEAK | STRONG |
| WF | WEAK | STRONG | WEAK |
| WB | WEAK | OFF | WEAK |

Fig. 3B

TACTILE SENSATION GENERATION DEVICE, TACTILE SENSATION GENERATION METHOD, AND NON-TRANSITORY COMPUTER-READABLE MEDIUM

CROSS REFERENCE TO RELATED APPLICATION

The present application is a bypass continuation of International Patent Application PCT/JP2022/021406, filed on May 25, 2022, which is based upon and claims the benefit of priority from Japanese patent application No. 2021-151790 filed on Sep. 17, 2021, the disclosure of which is incorporated herein in its entirety by reference.

BACKGROUND

The present invention relates to a tactile sensation generation device, a tactile sensation generation method, and a program.

Accompanying the development of computer technologies, a system in which a person experiences a virtual space has further been progressing. For example, Japanese Unexamined Patent Application Publication No. 2016-126766 discloses a system which generates a tactile perception effect about a virtual object in a virtual environment.

SUMMARY

A tactile sensation generation device according to the present embodiment includes:

a posture information generation unit configured to generate posture information representing a posture of a wearing part of a wearer of a vibration element;

a fluid direction information acquisition unit configured to acquire fluid direction information representing a direction of a flow of a fluid in a virtual space and fluid speed information representing a speed of the flow of the fluid in the virtual space;

a comparison unit configured to compare the posture information of the wearing part with the fluid direction information; and a vibration control unit configured to control vibration of the vibration element based on a result of a comparison by the comparison unit. After the vibration control unit calculates a time difference based on the fluid speed information and vibrates a first vibration element, the vibration control unit vibrates a second vibration element, which is spaced apart from the first vibration element, with the time difference.

A tactile sensation generation method, which is executed by a tactile sensation generation device, according to the present embodiment includes:

a posture information generation step of generating posture information representing a posture of a wearing part of a wearer of a vibration element;

a fluid direction information acquisition step of acquiring fluid direction information representing a direction of a flow of a fluid in a virtual space and fluid speed information representing a speed of the flow of the fluid in the virtual space;

a comparison step of comparing the posture information of the wearing part with the fluid direction information; and a vibration control step of controlling vibration of the vibration element based on a result of a comparison. In the vibration control step, after the tactile sensation generation device calculates a time difference based on the fluid speed information and vibrates a first vibration element, the tactile sensation generation device vibrates a second vibration element, which is spaced apart from the first vibration element, with the time difference.

A program according to the present embodiment causes a computer to execute a method, the method including:

a posture information generation step of generating posture information representing a posture of a wearing part of a wearer of a vibration element;

a fluid direction information acquisition step of acquiring fluid direction information representing a direction of a flow of a fluid in a virtual space and fluid speed information representing a speed of the flow of the fluid in the virtual space;

a comparison step of comparing the posture information of the wearing part with the fluid direction information; and a vibration control step of controlling vibration of the vibration element based on a result of a comparison, and in the vibration control step, after a time difference is calculated based on the fluid speed information and a first vibration element is vibrated, a second vibration element, which is spaced apart from the first vibration element, is vibrated with the time difference.

BRIEF DESCRIPTION OF THE DRAWINGS

FIG. 2B is a table illustrating one example of control of a tactile sensation sensor which corresponds to kinds of winds, according to the first embodiment.

FIG. 3B is a table illustrating one example of control of the tactile sensation sensor which corresponds to directions of winds, according to the first embodiment.

DETAILED DESCRIPTION

First Embodiment

An embodiment of the present invention will hereinafter be described with reference to drawings.

Figure 1A:
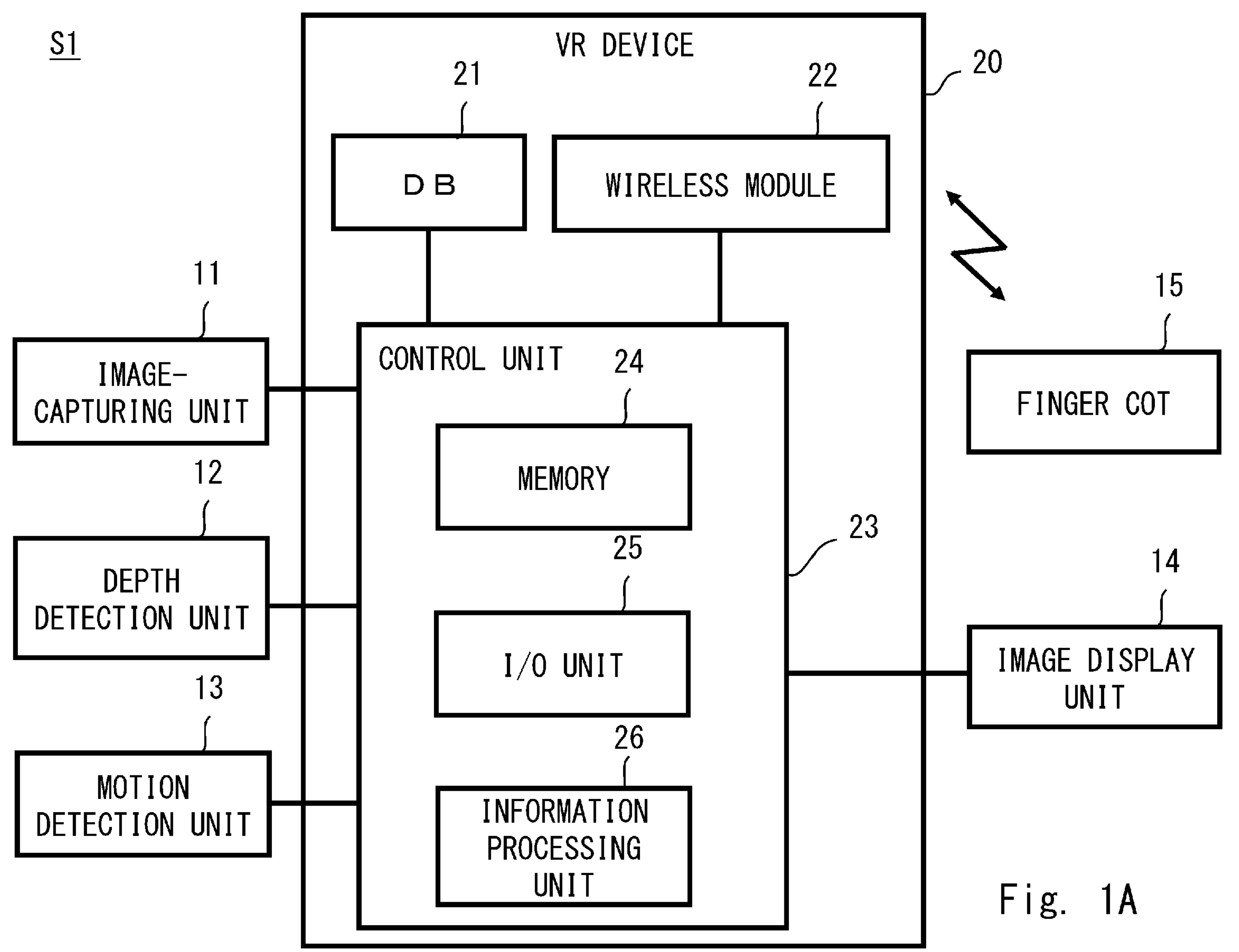
FIG. 1A is a block diagram illustrating a configuration example of a VR (virtual reality) system according to a first embodiment.

FIG. 1A is a block diagram illustrating a configuration example of a VR system. A VR system S1 is a system which provides an experience in a virtual space for a user and includes an image-capturing unit 11, a depth detection unit 12, a motion detection unit 13, an image display unit 14, a finger cot 15, and a VR device 20. In the following, each of configuration elements of the VR system S1 will be described.

The image-capturing unit 11 is a camera which photographs a real space, generates photographed video data as RGB data, and outputs the photographed video data to the VR device 20. The depth detection unit 12 is a sensor which is provided so as to agree with an angle of view of the image-capturing unit 11 as much as possible, generates depth data of pixels of the photographed video data, and outputs the depth data to the VR device 20. The depth detection unit 12 may be an infrared-ray reception sensor, for example. Further, the depth detection unit 12 may be a three-dimensional camera such as a stereo camera or a ToF (time of flight) camera, and in this case, the image-capturing 11 and the depth detection unit 12 can be configured as the same three-dimensional camera. As described later, the depth data are used for recognizing a positional relationship (for example, a distance) between the image-capturing unit 11 and a part of a human body such as a finger and for deciding coordinates of the finger in the real space.

The motion detection unit 13 comprehensively detects an acceleration in movement of the image-capturing unit 11 itself, a rotation acceleration, a gravitational acceleration, and so forth, thereby detects a motion state (variations of direction and position) of the image-capturing unit 11, and outputs the motion state to the VR device 20. The motion detection unit 13 may be configured with an acceleration sensor, a gyrosensor, or the like, for example, and may be mounted on the image-capturing unit 11 or the user.

The image display unit 14 is a display that displays a video of the virtual space which is generated by the VR device 20. The above-described image-capturing unit 11 to image display unit 14 and the VR device 20 are integrally provided as an HMD (head mounted display) in this example and is worn on a head of the user but may be provided as another device.

The finger cot 15 is a wearable device which performs wireless communication with the VR device 20 and is worn on each finger of the user. The finger cot 15 executes control of at least either one of vibration and a temperature change in response to an event in the virtual space displayed on the image display unit 14 and can thereby generate a tactile sensation about the event in the virtual space for the finger of the user.

Figure 1B:
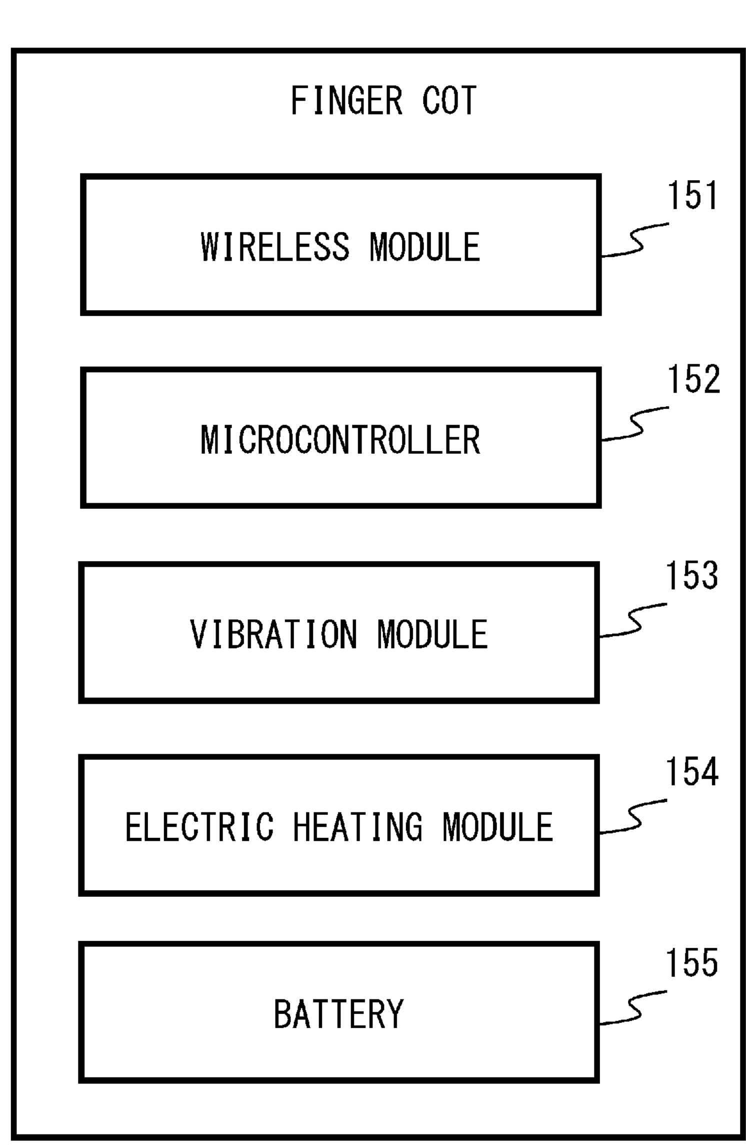
FIG. 1B is a block diagram illustrating one example of a finger cot according to the first embodiment.

FIG. 1B is a block diagram illustrating a configuration example of the finger cot 15. The finger cot 15 includes a wireless module 151, a microcontroller 152, a vibration module (vibration element) 153, an electric heating module (electric heating element) 154, and a battery 155. Those components are formed to have small sizes so as to be capable of being mounted on an internal portion of a finger cot main body. In the following, each of the components of the finger cot 15 will be described.

The wireless module 151 receives a control signal about at least either one of the vibration and the temperature change from the VR device 20 by short-range wireless communication such as Bluetooth®, for example.

The microcontroller 152 generates a vibration control signal for controlling vibration for the vibration module 153 and a temperature control signal for controlling a temperature state for the electric heating module 154 based on the control signals received by the wireless module 151 and outputs those to the modules.

The vibration module 153 is configured with a module which vibrates a small-sized coil or the like by a magnetic force, for example. The vibration module 153 itself vibrates based on the vibration control signal from the microcontroller 152 and thereby transmits vibration to the finger of the user via the finger cot main body.

The electric heating module 154 is configured with an element which is capable of changing a temperature by an electric signal such as a Peltier device, for example. The electric heating module 154 generates heat or is cooled based on the temperature control signal from the microcontroller 152 and thereby transmits a temperature of a high temperature or a low temperature to the finger of the user via the finger cot main body.

The battery 155 feeds power to the other components of the finger cot 15.

Figure 1C:
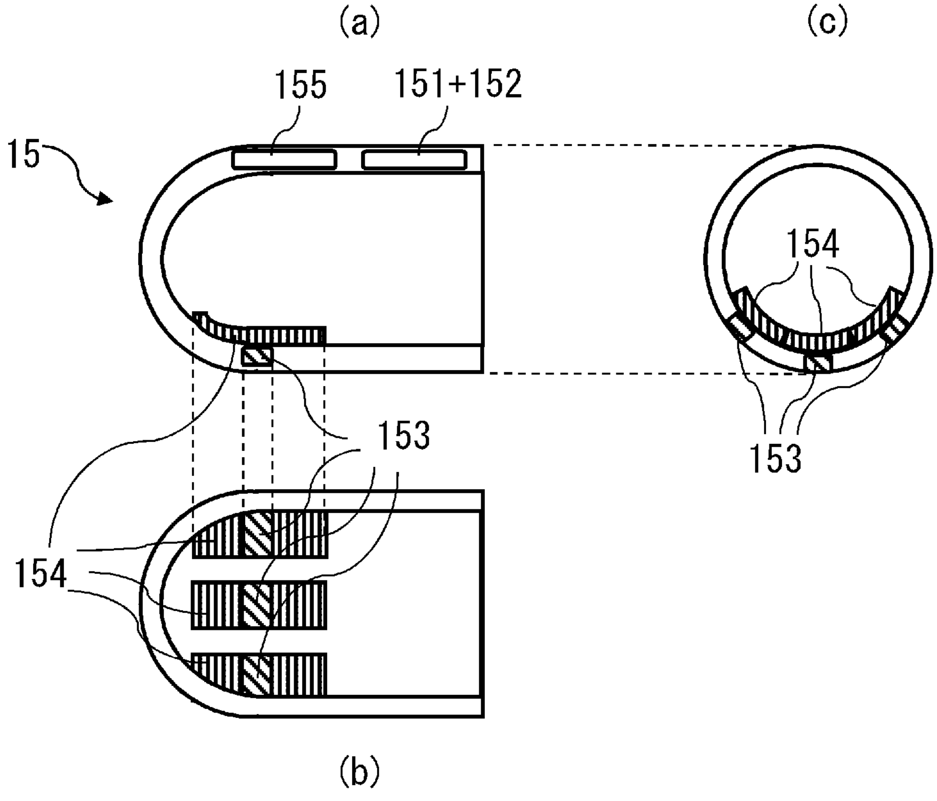
FIG. 1C is a cross-sectional view illustrating one example of the finger cot according to the first embodiment.

FIG. 1C is a cross-sectional view illustrating one example of the finger cot 15. A section (a) of FIG. 1C is a cross-sectional view in a case where the finger cot 15 in a long-side direction is sectioned from a perpendicular direction, a section (b) is a cross-sectional view in a case where the finger cot 15 in the long-side direction is sectioned from a horizontal direction, and a section (c) is a cross-sectional view in a case where the finger cot 15 in a short-side direction is sectioned from the perpendicular direction. Referring to the sections (a) to (c) of FIG. 1C, in the finger cot 15, the electric heating module 154 is provided on an inside surface (that is, a portion which a fingertip of the user directly touches) of a main body, and the vibration module 153 is provided in a lower layer (an internal portion of the main body of the finger cot 15) of the electric heating module 154. Because the fingertip of the user directly touches the electric heating module 154, the user is likely to sense a temperature change.

As for the above-described vibration module 153 and electric heating module 154, one vibration module 153 and one electric heating module 154 are provided to configure one tactile sensation sensor, and three sets of tactile sensation sensors are provided so as to surround a finger cushion of the user (that is, in a circumferential direction in a case where a direction in which the finger extends is set as a rotation axis). In such a manner, the tactile sensation sensors are partitioned into a plurality of regions. Further, in the internal portion (that is, a portion between the inside surface and an outside surface) of the main body of the finger cot 15, an IC (integrated circuit) including the wireless module 151 and the microcontroller 152 and the battery 155 are provided.

Figure 1D:
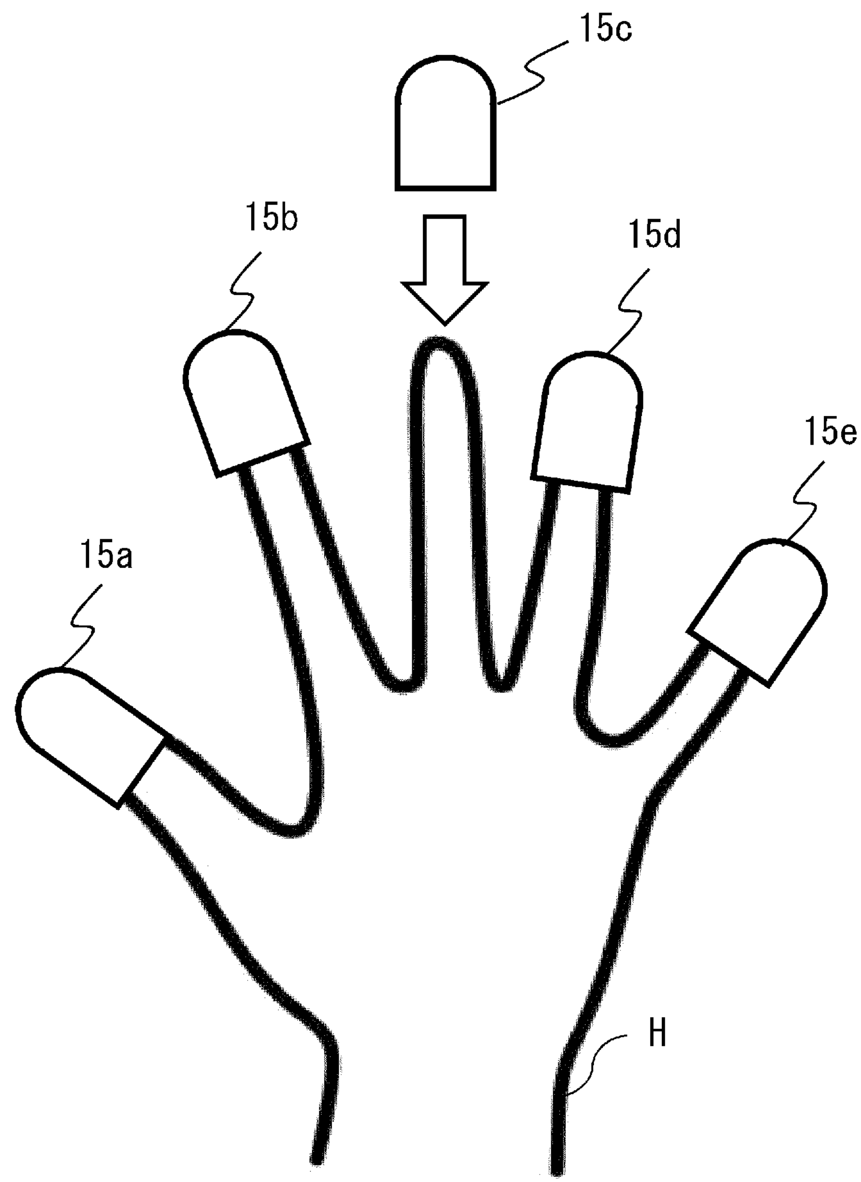
FIG. 1D is a diagram illustrating a wearing example of finger cots according to the first embodiment.

FIG. 1D is a diagram illustrating a wearing example of the finger cots 15. In FIG. 1D, finger cots 15*a* to 15*e* are worn on the thumb to little finger of a right hand H of the user, and the user can thereby experience a tactile sensation about an event in the virtual space by feelings on the fingers. However, the finger cots 15 do not have to be worn on all of the fingers but may be worn on one or more arbitrary fingers.

Returning to FIG. 1A, the description will be continued. The VR device 20 includes a DB 21, a wireless module 22, and a control unit 23. The DB 21 is configured with a storage device such as a flash memory, a memory card, an HDD (hard disk drive), or an optical disk drive, for example, but the kind of storage device is not limited to those. Further, the DB 21 may be provided in an external portion of the VR device 20. In this case, the VR device 20 may be connected with the DB 21 via an information transmission-reception unit which is not illustrated and may acquire data stored in the DB 21.

The DB 21 stores video data of backgrounds of the virtual space and video data and coordinate data of objects (virtual objects) in the virtual space. The virtual object is an object having a three-dimensional shape such as a cube, for example, and its position is specified by the coordinate data. The DB 21 may store video data of an avatar (a character serving as a representation of the user) of the user of the VR device 20. Further, the DB 21 also stores settings of xyz coordinate spaces in the real space and the virtual space.

Further, the DB 21 stores data about wind directions (fluid directions) and wind speeds (fluid speeds) of winds which flow in the virtual space. The wind which flows in the virtual space is defined at least in a region in the virtual space, in which the user is movable, and its wind direction and wind speed are changeable in accordance with a lapse of time. Note that "wind speed" includes not only a fixed speed but also a wind speed having a variation of strength and weakness. The variation may include a variation having strength and weakness in a fixed pattern and a variation having an irregular fluctuation in strength and weakness, the fluctuation reflecting a wind in the real space in an approximating manner. The irregular fluctuation in strength and weakness is added to the wind speed, and the user is thereby enabled to experience a feeling closer to a natural wind in the virtual space. The DB 21 may store atmospheric temperatures in the virtual space as other environment settings.

In addition, the DB 21 also stores control settings of the vibration module 153 and the electric heating module 154, the control settings corresponding to kinds of winds (wind speeds) and wind directions. This will be described in detail later.

The wireless module 22 makes possible wireless communication with the wireless module 151 of the finger cot 15 by the short-range wireless communication and transmits a control signal about at least either one of the vibration and the temperature change, the control signal being generated by the control unit 23, as tactile sensation data to the wireless module 151.

The control unit 23 acquires photographed video data, depth data, and the motion state of the image-capturing unit 11 respectively from the image-capturing unit 11, the depth detection unit 12, and the motion detection unit 13. The control unit 23 generates video data representing the virtual space by using the above data and data about the virtual space which are stored in the DB 21 and outputs the video data to the image display unit 14. In addition, the control unit 23 generates tactile sensation data representing a feeling of an object in the virtual space and outputs the tactile sensation data to the finger cots 15 via the wireless module 22. As described later, the tactile sensation data include the vibration control signal for the vibration module 153 and the temperature control signal for the electric heating module 154. This will be described in detail later.

The control unit 23 includes a memory 24, an I/O (input/output) unit 25, and an information processing unit 26. In the following, each of the units of the control unit 23 will be described.

The memory 24 is configured with a volatile memory, a non-volatile memory, or a combination of those. The number of memories 24 is not limited to one but a plurality of memories 24 may be provided. Note that the volatile memory may be a RAM (random-access memory) such as a DRAM (dynamic random-access memory), or a SRAM (static random-access memory), for example. The non-volatile memory may be a PROM (programmable ROM), an EPROM (erasable programmable read-only memory), or a flash memory, for example.

The memory 24 is used for storing one or more commands. Here, one or more commands are stored as a software module group in the memory 24. The information processing unit 26 reads out and executes one or more commands from the memory 24 and can thereby perform the following processes.

The I/O unit 25 is a hardware interface which executes input and output of information from and to an external portion of the control unit 23. In the present embodiment, the control unit 23 is connected with the image-capturing unit 11, the depth detection unit 12, the motion detection unit 13, the image display unit 14, and the finger cots 15 and appropriately performs input and output of information from and to those via the I/O unit 25.

The information processing unit 26 is configured with an arbitrary processor or the like such as a CPU (central processing unit), an MPU (microprocessing unit), an FPGA (field-programmable gate array), a DSP (digital signal processor), or an ASIC (application specific integrated circuit). Note that the memory 24 may include a memory which is built in the information processing unit 26 in addition to a memory provided in an external portion of the information processing unit 26.

Figure 1E:
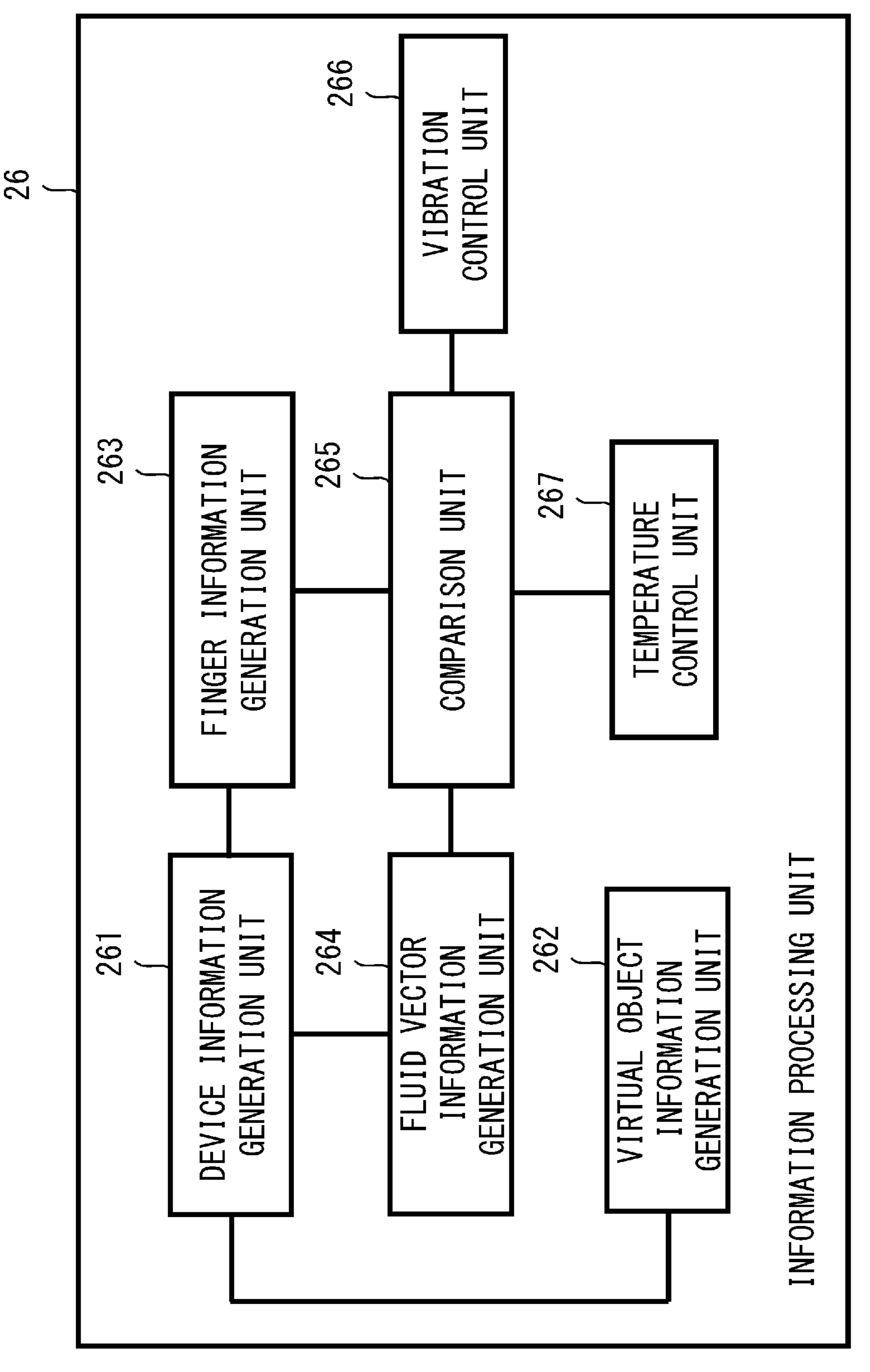
FIG. 1E is a block diagram illustrating one example of an information processing unit according to the first embodiment.

FIG. 1E is a block diagram illustrating a configuration example of the information processing unit 26. The information processing unit 26 reads out and executes software (computer programs) from the memory 24 and thereby realizes functions of a device information generation unit 261, a virtual object information generation unit 262, a finger information generation unit 263, a fluid vector information generation unit 264, a comparison unit 265, a vibration control unit 266, a temperature control unit 267, and so forth. In the following, each of those functions will be described.

The device information generation unit 261 generates data of coordinates and a posture of a specific spot of the VR device 20 by using the photographed video data, the depth data, and the motion state of the image-capturing unit 11. In this example, the device information generation unit 261 generates data of coordinates and a posture of the image-capturing unit 11 in the real space. The device information generation unit 261 decides a position of the image-capturing unit 11 at a time when a power source of the VR device 20 is turned on or at a timing when a reset button is pressed as an initial position of the coordinates in the real space. Further, the device information generation unit 261 decides the posture of the image-capturing unit 11 at a time when the power source of the VR device 20 is turned on or at a timing when the reset button is pressed as a reference posture (initial posture) in the real space. Subsequently, while the initial position and the reference posture are set as an initial state, changes in the position and the posture (direction) of the image-capturing unit 11 in the xyz coordinate space in the real space, the changes being tracked by the motion detection unit 13, are updated in real time, and updated information is continued to be output to the virtual object information generation unit 262, the finger information generation unit 263, and the fluid vector information generation unit 264.

The virtual object information generation unit 262 is configured with a GPU (graphics processing unit) or the like. The virtual object information generation unit 262 uses the video data and the coordinate data of the virtual object which are stored in the DB 21 and further settings of the xyz coordinate space in the virtual space and can thereby arrange the virtual object in an arbitrary position in the virtual space. The virtual object information generation unit 262 further uses the video data of the background in the virtual space which is stored in the DB 21 and thereby generates a two-dimensional image of the virtual space which represents a state where the virtual object is arranged by a procedure of rendering by a program stored in the memory 24. In this case, the virtual object information generation unit 262 updates and generates the two-dimensional image of the virtual space such that a direction in which the virtual object is seen is changed in accordance with the changes in the position and the posture of the image-capturing unit 11 in the xyz space in the real space. The virtual object information generation unit 262 outputs the updated image to the image display unit 14 and causes the image display unit 14 to display the updated image. Note that each apex (that is, each point specifying a boundary of the virtual object) of the virtual object is represented as coordinates in the xyz coordinate space in the virtual space and is output as the coordinate data of the virtual object to the image display unit 14.

The finger information generation unit 263 (posture information generation unit) uses the above-described photographed video data and depth data and thereby recognizes presence of the fingers (and the finger cots 15) of the user which appear on the photographed video data. Taking into consideration the posture of the image-capturing unit 11, the finger information generation unit 263 performs a comparison about a relative relationship between the position of the image-capturing unit 11 and the position of the finger and thereby generates finger coordinate data in the xyz coordinate space in the real space. The generated finger coordinate data of the finger cot 15 are updated in real time.

In addition, the finger information generation unit 263 acquires a posture (direction) of the finger cot 15 as posture information. The finger information generation unit 263 can detect the posture of the finger cot 15 by an infrared-ray reception sensor which is provided in the VR device 20 and is not illustrated, for example. However, a method for acquiring the posture of the finger cot 15 is not limited to this. For example, a motion detection sensor is provided in the finger cot 15, and the posture (and the position) of the finger cot 15 may thereby be detected based on the detection result of the sensor. As another example, the finger information generation unit 263 analyzes the photographed video data and may thereby detect the posture of the finger cot 15 which is photographed in the video. The detected posture of the finger cot 15 is updated in real time.

Figure 1F:
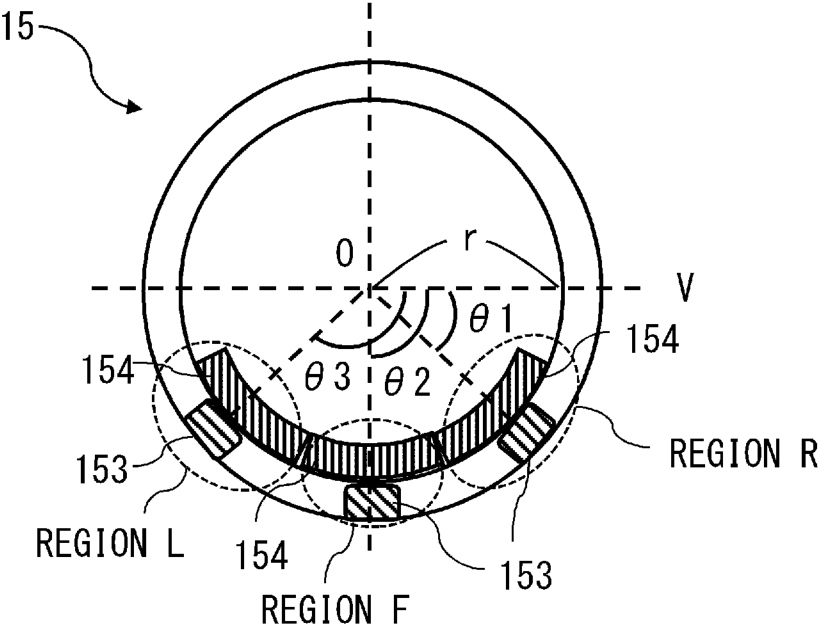
FIG. 1F is a diagram illustrating one example of finger coordinates of the finger cot according to the first embodiment.

FIG. 1F is a diagram illustrating one example of finger coordinates of the finger cot 15. FIG. 1F illustrates the cross-sectional view of the finger cot 15 in a generally circular shape, which is illustrated in the section (c) of FIG. 1C and which is enlarged. Three sets of tactile sensation sensors are provided in a region L on a left side of the finger, a region F in a central portion of the finger, and a region R on a right side of the finger. The finger information generation unit 263 can generate coordinates of a center O of a cross section of the finger cot 15, which is illustrated in FIG. 1F, as the finger coordinates in the real space, for example, and can generate the posture at the center O as the posture of the finger cot 15 in the real space.

The finger information generation unit 263 uses those sets of finger data in the real space and the settings of the xyz coordinate space in the virtual space, which are stored in the DB 21, and thereby generates information about the finger coordinates and the posture in the xyz coordinate space in the virtual space. In such a manner, the finger information generation unit 263 generates data of the finger coordinates and the posture of the finger wearing the finger cot 15 as finger information and outputs the information about each of the finger cots 15 to the comparison unit 265. Data of the updated finger information are output from the finger information generation unit 263 in response to motions in the real space, and in the virtual space, the fingers can thereby perform motions synchronized with those in the real space. Note that the finger information generation unit 263 may generate information about a hand by recognizing not the fingers alone but the whole hand.

Note that the finger information generation unit 263 is capable of generating finger coordinate data and a posture of the tactile sensation sensor about the finger cot 15 for each of the fingers. Positions and postures of the tactile sensation sensors, which are provided in the regions L to R, relative to the center O are fixed, and information about those is stored in the DB 21. For example, as illustrated in FIG. 1F, in a case where a horizontal line V which is horizontal to a ground surface and passes through the center O is assumed to be present, the positions and the postures of the tactile sensation sensors, which are provided in the regions L to R, relative to the center O can uniquely be defined by respective angles $\theta 1$ to $\theta 3$ between the regions L to R and the horizontal line V and a distance r between the center O and the main body of the finger cot 15. Consequently, the finger information generation unit 263 uses data of the finger coordinates and the posture which are related to the center O and data of the respective positions and postures of the tactile sensation sensors in the regions L to R relative to the center O and can thereby generate the finger coordinate data and the postures of the tactile sensation sensors in the regions L to R. A description will be made later about processes using the finger coordinate data and the postures of the tactile sensation sensors, the finger coordinate data and the postures being obtained in the above manner.

Further, in a case where an image of the finger is captured by the image-capturing unit 11, the finger information generation unit 263 uses the data of the finger in the avatar which is stored in the DB 21 and can thereby generate a video of the finger in the virtual space, output the video to the image display unit 14, and cause the image display unit 14 to display the video. Accordingly, the user can recognize the finger of the user himself/herself in the virtual space.

The fluid vector information generation unit 264 (fluid direction information acquisition unit) acquires wind direction information (fluid direction information) and wind speed information (fluid speed information) of a wind flowing in the virtual space, which are stored in the DB 21, as velocity vector (hereinafter, denoted as wind vector (fluid vector)) information about the wind. This wind vector is updated in accordance with a lapse of time based on information stored in the DB 21. The fluid vector information generation unit 264 outputs the acquired wind vector information to the comparison unit 265.

Note that as described above, a variation of strength and weakness of the wind speed in the wind vector may be set as data of an environment in the virtual space in the DB 21 but may be set by the fluid vector information generation unit 264.

The comparison unit 265 acquires the finger information about the finger cot 15 and the wind vector information, compares those, and thereby detects which place of the finger cot 15 is hit by a wind in which wind direction and at which wind speed in the virtual space. In particular, the comparison unit 265 compares posture information about the finger with the wind direction information and thereby detects in which wind direction the wind blows against each of the sets of the tactile sensation sensors. The comparison unit 265 outputs those pieces of information about the wind blowing against each of the sets to the vibration control unit 266 and the temperature control unit 267.

Based on the information about the wind blowing against each of the sets which is output from the comparison unit 265, the vibration control unit 266 generates the vibration control signal for controlling the vibration in each of the vibration modules 153 of each of the finger cots 15. In particular, based on a result of a comparison between the posture information about the finger and the wind direction information by the comparison unit 265, the vibration control unit 266 controls the vibration of each of the vibration modules 153. The vibration control unit 266 outputs the vibration control signal about each of the vibration modules 153 of each of the finger cots 15 to the wireless module 22.

Based on the information about the wind blowing against each of the sets which is output from the comparison unit 265, the temperature control unit 267 generates the temperature control signal for controlling the temperature in each of the electric heating modules 154 of each of the finger cots 15. The temperature control unit 267 transmits the temperature control signal about each of the electric heating modules 154 of each of the finger cots 15 to the wireless module 22.

The wireless module 22 transmits the tactile sensation data including the vibration control signal and the temperature control signal to the wireless module 151 of each of the finger cots 15. As described above, based on those control signals received by the wireless module 151, the microcontroller 152 of each of the finger cots 15 controls each of the vibration modules 153 and each of the electric heating modules 154.

Next, a description will be made about examples of control of the vibration module 153 and the electric heating module 154, the control being decided by the vibration control unit 266 and the temperature control unit 267 based on a state of a wind blowing in the virtual space and the positions and the postures of the fingers. In the following, each of viewpoints about the wind speed and the wind direction will be described.

Figure 2A:
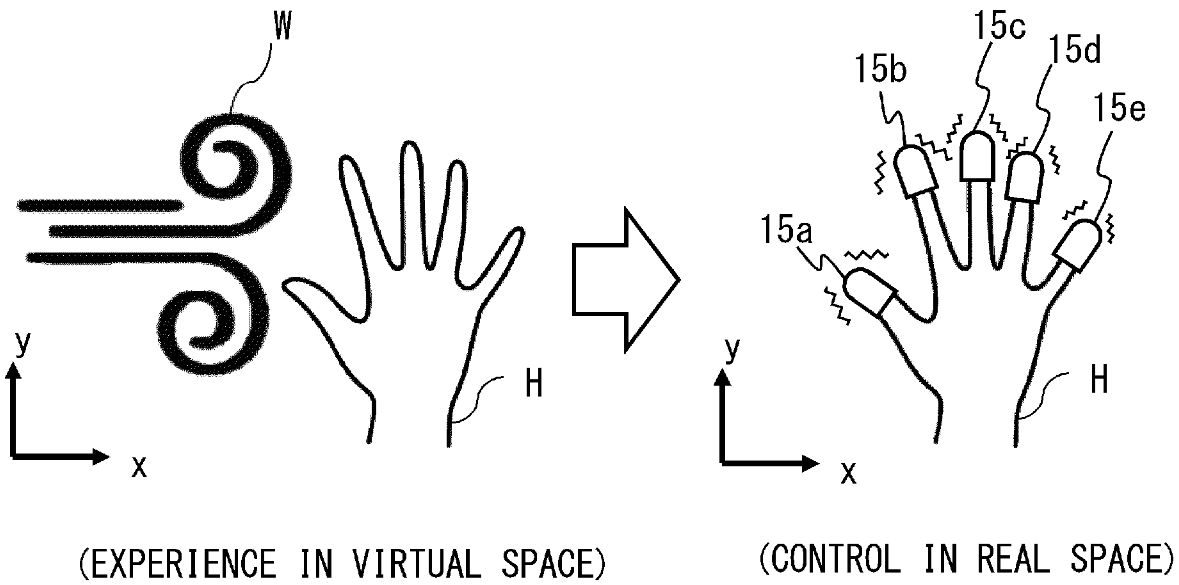
FIG. 2A is a diagram illustrating correspondence between an experience in a virtual space and control in a real space, according to the first embodiment.

FIG. 2A is a diagram for comparing the state of the wind blowing in the virtual space with control of the finger cots 15 in the real space. In order to cause the user to experience a state where a wind W from left blows against a right hand H of the user in an x direction in the virtual space, in the real space, the respective vibration modules 153 and electric heating modules 154 of the finger cots 15 worn on the right hand H of the user are controlled. Qualitatively, in spots of the fingers against which the wind blows in the virtual space, a state is established where the vibration modules 153 vibrate and the electric heating modules 154 are cooled.

Note that the wind W is capable of being dealt with as a virtual object and may be displayed in the two-dimensional image in the virtual space as information which is directly visualized by the virtual object information generation unit 262. However, while the wind is not directly visualized by the virtual object information generation unit 262, the wind may indirectly be displayed as a representation in a video about the background in the virtual space or about the avatar of the user.

FIG. 2B is a table illustrating one example of control settings stored in the DB 21 and illustrating one example of control of the tactile sensation sensor which corresponds to kinds of winds (wind speeds). Here, the kinds of winds are four kinds which are (1) breeze (less than 3 m/s), (2) slightly strong wind (3 m/s or more to less than 7 m/s), (3) strong wind (7 m/s or more to less than 10 m/s), and (4) violent wind (10 m/s or more), but the number of kinds of wind speeds and a manner of categorization are not limited to the above example. Further, magnitudes of oscillation (strength of vibration) and vibration frequencies of the vibration module 153 and values of temperature lowering from an ordinary temperature in the electric heating module 154, which are parameters indicated below, are only examples and are appropriately adjustable in accordance with actual characteristics of the vibration module 153 and the electric heating module 154 or environment settings of the virtual space.

(1) In a case of the breeze (less than 3 m/s), settings are made such that the oscillation of the vibration module 153 becomes very small, the vibration frequency becomes intermediate, and the temperature lowering from the ordinary temperature in the electric heating module 154 becomes 0° C. or more to less than 3° C. The user wearing the finger cots 15 experiences weak vibration to skin and subtle lowering of an apparent temperature and can thereby experience a tactile sensation of contact of the breeze with the fingers in the virtual space.

(2) In a case of the slightly strong wind (3 m/s or more to less than 7 m/s), settings are made such that the oscillation of the vibration module 153 becomes small, the vibration frequency becomes intermediate, and the temperature lowering from the ordinary temperature in the electric heating module 154 becomes 3° C. or more to less than 7° C. When (2) is compared with (1), the oscillation of the vibration module 153 becomes larger, and the electric heating module 154 has a lower temperature. Thus, the user wearing the finger cots 15 experiences stronger vibration to the skin and lowering of the apparent temperature and can thereby experience a tactile sensation of contact of the slightly strong wind with the fingers in the virtual space.

(3) In a case of the strong wind (7 m/s or more to less than 10 m/s), settings are made such that the oscillation of the vibration module 153 becomes intermediate, the vibration frequency becomes high, and the temperature lowering from the ordinary temperature in the electric heating module 154 becomes 7° C. or more to less than 10° C. When (3) is compared with (2), the oscillation of the vibration module 153 becomes much larger, the vibration frequency becomes high, and the electric heating module 154 has a much lower temperature. Thus, the user wearing the finger cots 15 experiences much stronger and sudden vibration to the skin and large lowering of the apparent temperature and can thereby experience a tactile sensation of contact of the strong wind with the fingers in the virtual space.

(4) In a case of the violent wind (10 m/s or more), settings are made such that the oscillation of the vibration module 153 becomes large, the vibration frequency becomes high, and the temperature lowering from the ordinary temperature in the electric heating module 154 becomes 10° C. or more. When (4) is compared with (3), the oscillation of the vibration module 153 becomes much larger, and the electric heating module 154 has a much lower temperature. Thus, the user wearing the finger cots 15 experiences much stronger vibration to the skin and larger lowering of the apparent temperature and can thereby experience a tactile sensation of contact of a stronger wind with the fingers in the virtual space.

Note that in (1) to (4), an arbitrary function can be applied to values of the temperature lowering from the ordinary temperature in the electric heating module 154 as long as the function monotonously increases in accordance with an increase in the wind speed. For example, in a case where the wind speed is N m/s, the value of the temperature lowering from the ordinary temperature in the electric heating module 154 may be set to N° C. Values of the oscillation and the vibration frequency of the vibration module 153 can be changed by arbitrary functions as long as the functions monotonously increase in accordance with an increase in the wind speed.

Further, in the settings, the above-described irregular fluctuation in strength and weakness is added to the magnitude of the oscillation of the vibration module 153, and the user can thereby feel a wind closer to that in reality in the virtual space. However, it is also possible to add similar fluctuations to the values of the vibration frequency of the vibration module 153 and of the temperature lowering from the ordinary temperature in the electric heating module 154.

Figure 3A:
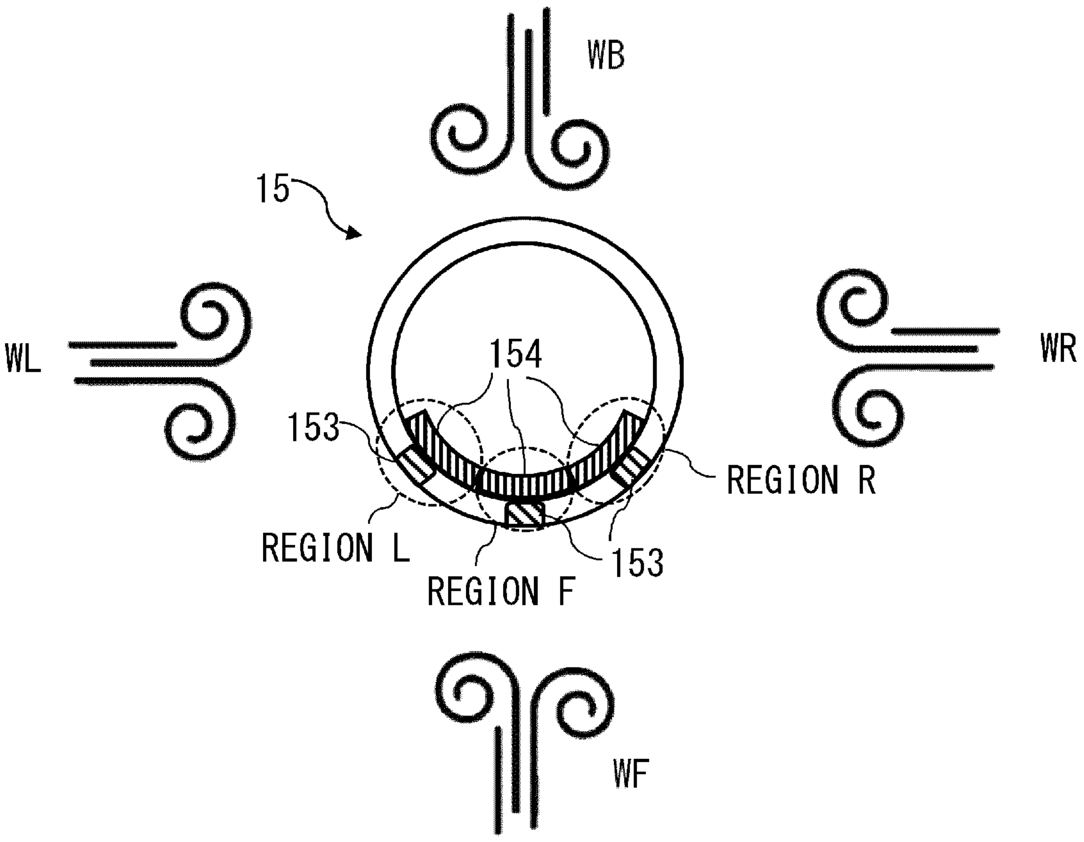
FIG. 3A is a diagram illustrating one example of directions of winds and positions of the tactile sensation sensors, according to the first embodiment.

FIG. 3A is a block diagram illustrating one example of directions of winds blowing in the virtual space and the positions of the tactile sensation sensors. FIG. 3A illustrates a cross-sectional view of the finger cot 15 illustrated in the section (c) of FIG. 1C and illustrates winds blowing against the finger in the virtual space by superimposing the winds on the cross-sectional view. The regions L, F, and R are as described by using FIG. 1F. Further, the winds blowing against the finger are illustrated while it is assumed that a wind WF from a direction of the finger cushion (front), a wind WR from a direction of a right side surface of the finger as seen in FIG. 3A, a wind WL from a direction of a left side surface of the finger as seen in FIG. 3A, and a wind WB from a direction of a fingernail (back) are present. However, kinds of wind directions are not limited to those examples.

FIG. 3B is a table illustrating one example of control settings stored in the DB 21 and illustrating one example of control of the tactile sensation sensor which corresponds to the wind directions. FIG. 3B illustrates how a degree of control is changed when the control of the tactile sensation sensor, which is illustrated in FIG. 2B, is performed in accordance with the wind speed. However, the settings of the control corresponding to the wind speed do not have to be the settings illustrated in FIG. 2B but may be arbitrary settings. Three kinds of operation levels "strong", "weak", and "off" (unoperating state) in FIG. 3B represent magnitudes of coefficients by which control contents (the oscillation and the vibration frequency of the vibration module 153 and a temperature lowering amount from the ordinary temperature in the electric heating module 154) in FIG. 2B are multiplied. For example, "strong" corresponds to 1, "weak" corresponds to 0.5, and "off" corresponds to 0, but those coefficient values are examples.

In a case where the wind direction is WL, the operation level of the tactile sensation sensor of the region L is set to "strong", the operation level of the tactile sensation sensor of the region F is set to "weak", and the operation level of the tactile sensation sensor of the region R is set to "off". This is because as illustrated in FIG. 3A, the wind WL is strongly blown against the tactile sensation sensor of the region L but is weakly blown against the tactile sensation sensor of the region F and is hardly blown against the tactile sensation sensor of the region R.

In a case where the wind direction is WR, the operation level of the tactile sensation sensor of the region L is set to "off", the operation level of the tactile sensation sensor of the region F is set to "weak", and the operation level of the tactile sensation sensor of the region R is set to "strong". This is because as illustrated in FIG. 3A, the wind WR is strongly blown against the tactile sensation sensor of the region R but is weakly blown against the tactile sensation sensor of the region F and is hardly blown against the tactile sensation sensor of the region L.

In a case where the wind direction is WF, the operation level of the tactile sensation sensor of the region L is set to "weak", the operation level of the tactile sensation sensor of the region F is set to "strong", and the operation level of the tactile sensation sensor of the region R is set to "weak". This is because as illustrated in FIG. 3A, the wind WF is strongly blown against the tactile sensation sensor of the region F but is weakly blown against the tactile sensation sensors of the regions L and R.

In a case where the wind direction is WB, the operation level of the tactile sensation sensor of the region L is set to "weak", the operation level of the tactile sensation sensor of the region F is set to "off", and the operation level of the tactile sensation sensor of the region R is set to "weak". This is because as illustrated in FIG. 3A, the wind WB is weakly blown against the tactile sensation sensors of the regions L and R but is hardly blown against the tactile sensation sensor of the region F.

In a case where the vibration control unit 266 and the temperature control unit 267 acquire information (information indicating the wind at which wind speed blows against each of the sets of tactile sensation sensors in which wind direction) output from the comparison unit 265, the vibration control unit 266 and the temperature control unit 267 refer to the above-described control settings illustrated in FIGS. 2B and 3B. As described above, in the FIGS. 2B and 3B, the operating tactile sensation sensors (modules) and the operation levels of the operating tactile sensation sensors are set. Based on those settings, the vibration control unit 266 and the temperature control unit 267 respectively generate the vibration control signal and the temperature control signal for setting each of the modules to the oscillation and the vibration frequency of the vibration module 153, which reproduce the wind speed and the wind direction of the wind blowing in the virtual space in each of the sets of tactile sensation sensors, and for setting each of the modules to the value of the temperature lowering from the ordinary temperature in the electric heating module 154. Accordingly, the vibration control unit 266 and the temperature control unit 267 can enable the user to experience the wind speed and the wind direction of the wind, which are set in the virtual space.

Further, the temperature control unit 267 may further change the temperature of the electric heating module 154 in accordance with "the atmospheric temperature in the virtual space" in the environment settings of the virtual space which are stored in the DB 21. For example, when the atmospheric temperature of the virtual space is a predetermined threshold value or less, settings may be made such that the temperature is further lowered by a predetermined value relative to the temperature of the electric heating module 154, which is set based on the above-described control settings illustrated in FIGS. 2B and 3B. In this case, the temperature control unit 267 may further lower the temperature of the electric heating module 154 from the ordinary temperature such that the temperature which lowers in accordance with an increase in the wind speed becomes a function which monotonously increases. Further, in a case where the atmospheric temperature of the virtual space is the predetermined threshold value or more (close to a body temperature or higher, for example), the temperature control unit 267 may raise the temperature of the electric heating module 154 from the ordinary temperature only by a predetermined value. In this case, the temperature control unit 267 may raise the temperature of the electric heating module 154 from the ordinary temperature such that the temperature which rises in accordance with an increase in the wind speed becomes a function which monotonously increases. Consequently, the temperature control unit 267 can also represent a hot wind which blows against the user in the virtual space. Note that the threshold value and the functions related to the rise or lowering of the temperature, which are described above, are stored in the DB 21, and the temperature control unit 267 can appropriately use the stored information.

A method for setting the control settings of the operation levels of the tactile sensation sensor in each of the regions is not limited to the method illustrated in FIGS. 3A and 3B.

Figure 3C:
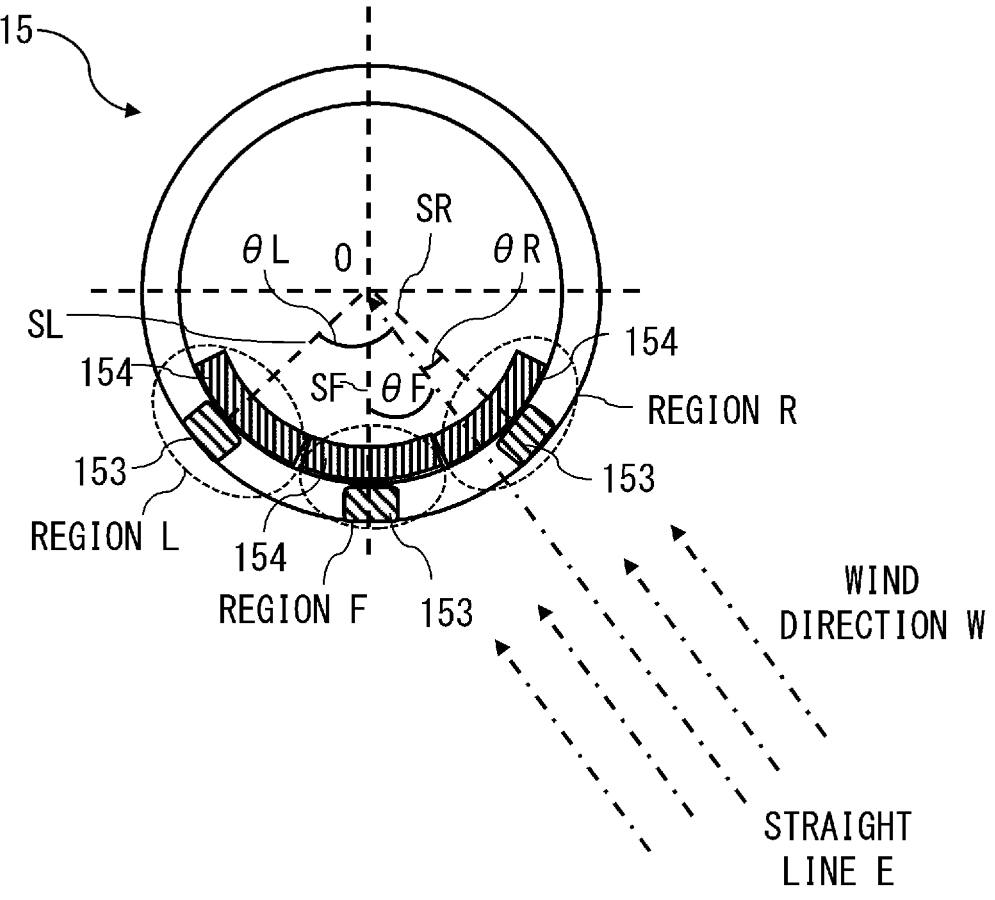
FIG. 3C is a diagram illustrating another control example of the tactile sensation sensor, according to the first embodiment.

In the following, the above method will be described by using FIG. 3C. FIG. 3C illustrates a configuration of the finger cot 15 which is similar to that illustrated in FIG. 1F. Further, in FIG. 3C, the wind W blowing in a wind direction W of a left-upward direction in FIG. 3C is further illustrated.

First, in the coordinates in the virtual space, respective straight lines SR, SF, and SL which couple the center O with the tactile sensation sensors of the regions R, F, and L are defined. Next, about the wind W, a straight line E in the wind direction W toward the center O is defined, and the angle of an angle formed between the straight line SR and the straight line E, the angle of an angle formed between the straight line SF and the straight line E, and the angle of an angle formed between the straight line SL and the straight line E are respectively defined as θR, θF, and θL (those angles will generically be denoted as angle θ). FIG. 3C illustrates the straight lines SR, SF, SL, and E and the respective angles θR, θF, and θL. Note that the angles θR, θF, and θL are defined as values of 0° or more to 180° or less. Further, the finger coordinate data and the postures of the tactile sensation sensors illustrated in the regions L to R are generated, and the angles θR, θF, and θL can thereby be derived.

The vibration control unit 266 obtains the angles θR, θF, and θL as described above, thereafter compares absolute values of the angles, and performs control to cause the vibration module 153 of the region corresponding to the smallest angle to vibrate at the strongest operation level. In the example illustrated in FIG. 3C, when the absolute values of the angles θR, θF, and θL are compared, the following magnitude relationship holds true.

$$|\theta R| < |\theta F| < |\theta L| \tag{1}$$

Consequently, the vibration control unit 266 causes the vibration module 153 of the region R corresponding to θR to vibrate at the strongest operation level. Further, the magnitude relationship of the operation levels of the vibration modules 153 in the regions becomes opposite to the magnitude relationship of the regions which is expressed in (1). That is, the operation levels are large in order of the region R, the region F, and the region L. Further, instead of (1), the operation levels may be set based on the following magnitude relationship.

$$\cos|\theta R| < \cos|\theta F| < \cos|\theta L| \tag{2}$$

In a case where the angle θ is 0°, because the wind blows, from the front, against the vibration module 153 of the corresponding region, the operation level becomes a maximum. On the other hand, in a case where the angle θ is 90° or more to 180° or less, because the wind hardly blows against the vibration module 153 of the corresponding region, the operation level becomes a minimum (for example, 0). The magnitude of the operation level can be set to an arbitrary value as long as the above-described magnitude relationship is satisfied. For example, in a case where the operation level at the angle θ of 0° is set to 1, when the angle θ is 0° or more to 90° or less, the vibration control unit 266 may set the operation level proportional to cos θ, and when the angle θ is more than 90° to 180° or less, the vibration control unit 266 may set the operation level to 0.

In the above, setting of the operation level of the vibration control unit 266 is described, but it is also possible to set the operation level of the temperature control unit 267 in a similar manner. Based on those settings, the vibration control unit 266 and the temperature control unit 267 respectively generate the vibration control signal and the temperature control signal for setting each of the modules to the oscillation and the vibration frequency of the vibration module 153, which reproduce the wind speed and the wind direction of the wind blowing in the virtual space in each of the sets of tactile sensation sensors, and for setting each of the modules to the value of the temperature lowering from the ordinary temperature in the electric heating module 154.

In the example described above, the vibration control unit 266 and the temperature control unit 267 control the vibrations and the temperatures in the tactile sensation sensors in all of the regions of the finger cot 15, but the region to be a control target may be one or more arbitrary regions of the finger cot 15.

In addition, the vibration control unit 266 may shift a timing for starting the control illustrated in FIGS. 3B and 3C for each of the finger cots 15 in accordance with the wind speed information (fluid speed information) and the wind direction information (fluid direction information) about the wind blowing and the positions of the plurality of finger cots 15 which are spaced away from each other.

For example, when the state illustrated in FIG. 2A is assumed to be established, the wind W blows in order such that the wind W first blows against the thumb of the right hand and finally blows against the little finger. In FIG. 2A, it is assumed that the finger cot 15*a* for the thumb of the right hand His distant from the finger cot 15*e* for the little finger, which is spaced apart from the finger cot 15*a*, by a distance d in an x axis and the wind speed of the wind W is v. When the comparison unit 265 (acquisition unit) acquires the finger information about each of the finger cots 15 and the wind vector information from the fluid vector information generation unit 264, the comparison unit 265 acquires the above information. The comparison unit 265 outputs the information of the wind blowing against each of the sets and the distance d (that is, the distance from windward to leeward) between the finger cots 15*a* and 15*e* to the vibration control unit 266.

Based on the output information, the vibration control unit 266 starts the operation of each of the modules of the finger cot 15*a* and starts the operation of each of the modules of the finger cot 15*e* after a timing when a time of d/v elapses from the above start of the finger cot 15*a*. Note that contents of the operation of each of the modules are as illustrated in the above-described FIGS. 2B and 3B. Note that a shift in timing is not limited to the finger cot 15*e*, but as for each of the modules of the finger cots 15*b* to 15*d*, timings of starts of the operations of those can be delayed from the start of the operation of each of the modules of the finger cot 15*a* by time differences corresponding to the respective distances from the finger cot 15*a* and to the wind speed v. Further, even in a case where the wind W stops, by similar control, the vibration control unit 266 can delay timings of stops of the operations of each of the modules of the finger cots 15*b* to 15*e* from the stop of the operation of each of the modules of the finger cot 15*a* by the time differences corresponding to the respective distances from the finger cot 15*a* and to the wind speed v.

Accordingly, the vibration control unit 266 can cause each of the modules to execute the operation with the time difference such that the finger cot 15 as a device closer to the windward has an earlier timing of the start or stop of the operation corresponding to the wind and the finger cot 15 as the device closer to the leeward has a more delayed timing of the start or stop of the operation corresponding to the wind. Consequently, the user can perceive that the wind W starts blowing from a left direction in FIG. 2A in the virtual space, for example, and can thus experience the wind W with a more realistic sensation.

In addition, the vibration control unit 266 and the temperature control unit 267 may shift the timings for starting the control illustrated in FIGS. 3B and 3C for each region unit of each of the finger cots 15 in accordance with the wind speed information (fluid speed information) and the wind direction information (fluid direction information) of the wind blowing and each position of the region of the finger cot 15.

For example, in the control illustrated in FIG. 3B, the tactile sensation sensor, in which the operation is first started (in other words, the vibration and the temperature change are started) among the wind directions, is the tactile sensation sensor in the region in which the operation level is "strong", and the operation is next started in the tactile sensation sensor in the region in which the operation level is "weak". The shift in the timing at which the tactile sensation sensor operates is set by an arbitrary method. For example, because the distances among the tactile sensation sensors are fixed in each of the finger cot 15, the vibration control unit 266 calculates the shift in the timing by dividing the value of the distance which is stored in the DB 21 by the wind speed of the wind. The vibration control unit 266 shifts, by the calculated value, operation timings for the tactile sensation sensor in the region in which the operation level is "strong" and the tactile sensation sensor in the region in which the operation level is "weak". Similarly to the vibration control unit 266, the temperature control unit 267 can also perform a process for shifting the operation timings.

However, a method for shifting the timing for starting the control in each of the regions is not limited to the above method. When the method is explained by again referring to FIG. 3C, as described above, the vibration control unit 266 performs control such that the operation levels of the vibration modules 153 become larger in order of the region R, the region F, and the region L. The control is performed such that the timings for starting the operations become earlier in order of the region R, the region F, and the region L. Moreover, when the angle θ is 0° or more to 90° or less, the vibration control unit 266 makes settings such that as the value of cos θ becomes larger (as the absolute value of 0 becomes smaller), the timing for starting the operation becomes earlier. For example, in FIG. 3C, the timing for starting the operation becomes earliest in a case where the angle θ is 0°, and at the timing which is later from the above timing by r*sin θR/v (where r denotes the distance between the center O and the main body of the finger cot 15 and v denotes the wind speed of the wind W), the vibration control unit 266 may start the operation of the vibration module 153 in the region R. The operations of the vibration modules 153 in the region F and the region L are started at the timings based on similar calculation. Further, in a case where the angle θ is more than 90° to 180° or less, as described above, the operation level is set to 0, and the setting can be made such that the operation is not performed. Similarly to the vibration control unit 266, the temperature control unit 267 can also perform the process for shifting the operation timings.

Note that the control about the timing for starting or stopping the operation, which is described above, can also be executed by the temperature control unit 267 instead of or in addition to the vibration control unit 266. In other words, changing the timing for the operation may be performed in either one or both of the vibration module 153 or the electric heating module 154 in the finger cot 15. For example, only a vibration timing of the vibration module 153 may be changed as described above. Further, as the time differences about the starts or stops of the operations of the finger cots 15, the vibration control unit 266 may use values corresponding to at least either one of the distances among the finger cots 15 and the wind speed v (values proportional to at least either one of the distances and the wind speed v, for example).

Further, the wind direction of the wind which is experienced by the user can be changed in accordance with a motion of the hand of the user. In a case where the user moves the hand, as described above, in accordance with the motion in the real space, the data of the finger information which are updated are output from the finger information generation unit 263. Accordingly, the vibration control unit 266 and the temperature control unit 267 can figure out that a positional relationship among the finger cots 15 relative to the wind is changed. Thus, the above-described control can be executed in accordance with the new positional relationship among the finger cots 15.

In addition, the finger information generation unit 263 can acquire a velocity vector of each of the finger cots 15. As described above, the velocity vector is acquired by the infrared-ray reception sensor which is provided in the VR device 20 and is not illustrated, the motion detection sensor, an analysis of the photographed video data, or the like. The finger information generation unit 263 outputs information about the velocity vector of each of the fingers to the comparison unit 265. Based on the finger information of each of the finger cots 15, the wind vector information, and the information about the velocity vector of each of the finger cots 15, the comparison unit 265 detects which place of the finger cot 15 is hit by the wind in which wind direction and at which wind speed in the virtual space. In this case, in a case where the velocity vector of a certain finger cot 15 has inverse components to the wind vector of the wind which hits the finger cot 15 (in other words, in a canceling direction), the comparison unit 265 sets the wind speed of the wind blowing against the finger cot 15 such that the wind speed of the wind blowing against the above finger cot 15 is increased by the above component amounts. Meanwhile, in a case where the velocity vector of a certain finger cot 15 has the same components as the wind vector (in other words, in an increasing direction), the comparison unit 265 sets the wind speed of the wind blowing against the finger cot 15 such that the wind speed of the wind blowing against the above finger cot 15 is decreased by the above component amounts. In other words, when the user moves the hand, the comparison unit 265 can cause the wind experienced by the user in the virtual space to reflect a relative speed to the wind against the fingers.

Based on the information of the wind speed which is decided as described above, the vibration control unit 266 and the temperature control unit 267 execute the control illustrated in FIGS. 2B and 3B. Accordingly, the apparent temperature of the wind in consideration of the relative speed to the wind against the fingers can be presented to the user.

The control about the timing for starting or stopping the operation, which is described above, may also be executed for the tactile sensation sensors provided in different positions in the finger cot 15 in a similar manner by using information about the positional relationship among the tactile sensation sensors with respect to the wind direction and about the wind speed.

Figure 4A:
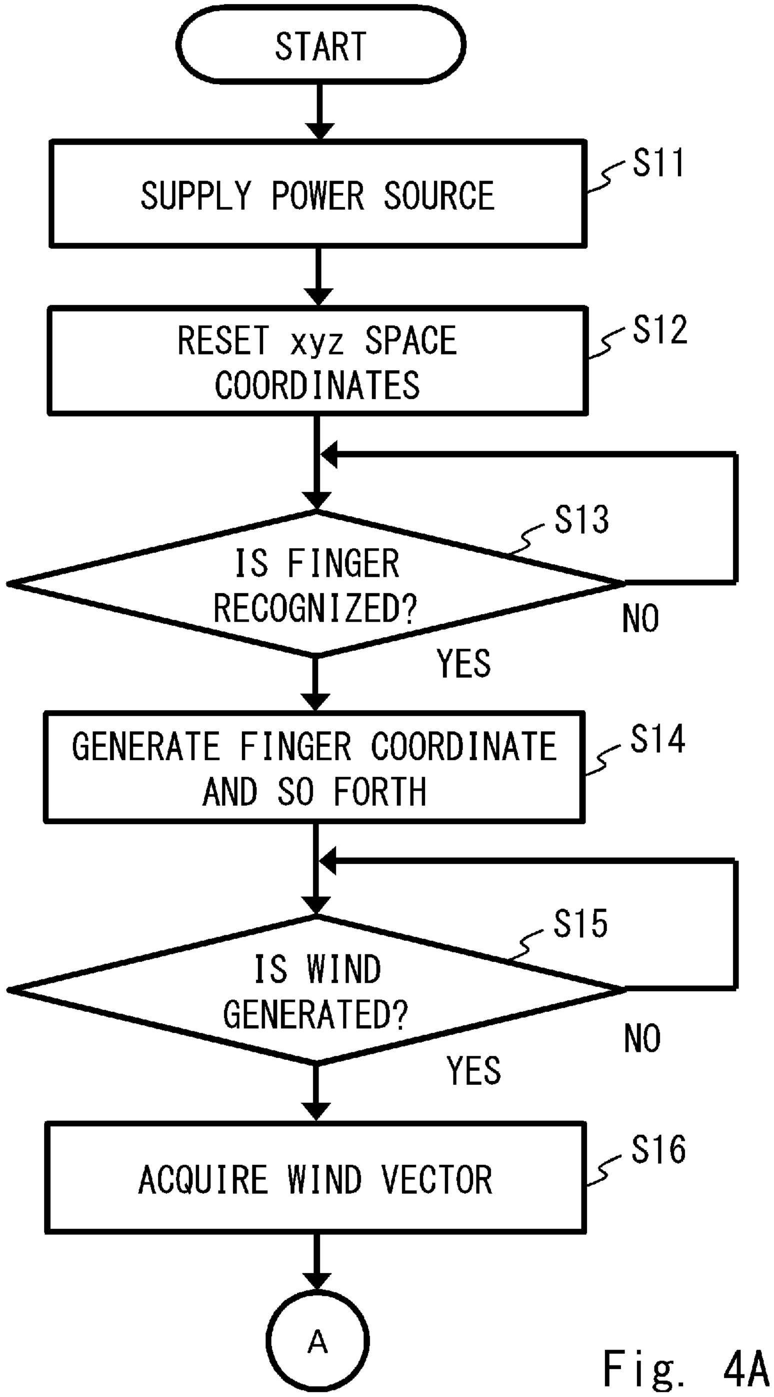
FIG. 4A is a flowchart illustrating a processing example of a VR device according to the first embodiment.
Figure 4B:
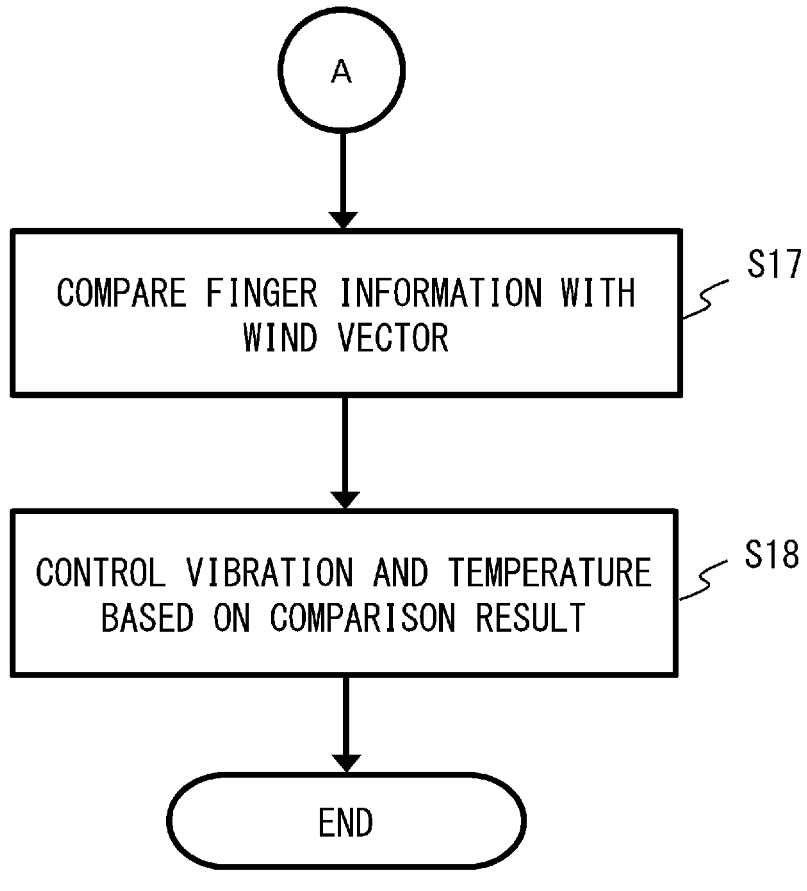
FIG. 4B is a flowchart illustrating the processing example of the VR device according to the first embodiment.

FIGS. 4A and 4B are flowcharts illustrating one example of processes executed by the VR device 20, and in the following, the processes by the VR device 20 will be described with reference to FIGS. 4A and 4B. Note that details of each of the processes are as described above, and descriptions will appropriately be skipped.

First, the power source is supplied to the VR device 20 by a manipulation by the user (step S11). In response to that, the control unit 23 resets the settings of the xyz coordinate spaces in the real space and the virtual space which are stored in the DB 21 and are dealt with inside the VR device 20 and makes preparations for starting subsequent processes (step S12).

Next, based on the data generated by the device information generation unit 261, the finger information generation unit 263 determines whether or not the finger of the user can be recognized (step S13). In a case where the finger of the user cannot be recognized (No in step S13), the finger information generation unit 263 returns to step S13 and again performs the process. In a case where the finger of the user can be recognized (Yes in step S13), the finger information generation unit 263 generates the finger coordinate data in the xyz coordinate space in the real space and detects the posture (direction) of the finger cot 15. Then, the finger information generation unit 263 uses those sets of finger data in the real space and the settings of the xyz coordinate space in the virtual space, which is stored in the DB 21, and thereby generates the data of the finger coordinates and the posture in the xyz coordinate space in the virtual space (step S14).

The fluid vector information generation unit 264 refers to the data stored in the DB 21 and thereby determines whether the wind flows in the virtual space where the user is present (whether the wind vector information has to be acquired) (step S15). In a case where the wind does not flow in the virtual space (No in step S15), the fluid vector information generation unit 264 returns to step S15 and again performs the process. In a case where the wind flows in the virtual space (Yes in step S15), the fluid vector information generation unit 264 acquires the wind vector information in the virtual space (step S16).

Note that as for the process in steps S13 to S14 and the process in steps S15 to S16, either one of those may earlier be executed, or both of those may be executed in parallel. Further, the virtual object information generation unit 262 may execute, at an arbitrary timing, a process for arranging the virtual object in an arbitrary position in the virtual space and for outputting the two-dimensional image of the virtual space, which includes the above virtual object, to the image display unit 14 and causing the image display unit 14 to display the two-dimensional image.

The comparison unit 265 acquires the finger information about each of the finger cots 15 and the wind vector information, compares those, and thereby detects the tactile sensation sensor of each of the finger cots 15 is hit by the wind in which wind direction and at which wind speed in the virtual space (step S17).

Then, based on the information (comparison result) of the wind blowing against each of the sets, the information being output from the comparison unit 265, the vibration control unit 266 and the temperature control unit 267 respectively generate the vibration control signal and the temperature control signal and transmits those to each of the finger cots 15 by the wireless module 22. Accordingly, the vibration and the temperature of the tactile sensation sensor related to each of the finger cots 15 are controlled (step S18).

As described above, in the VR device 20 (tactile sensation generation device), the finger information generation unit 263 (posture information generation unit) generates the posture information which represents the posture of the finger (wearing part) of the user of the vibration module 153, and the fluid vector information generation unit 264 (fluid direction information acquisition unit) acquires the wind direction information (fluid direction information) which represents the direction of the flow of the wind in the virtual space. The comparison unit 265 compares the posture information of the finger with the wind direction information, and the vibration control unit 266 controls the vibration of the vibration module 153 based on the result of the comparison by the comparison unit. Accordingly, the user is enabled to recognize the wind in the virtual space as being closer to a wind in reality.

Further, the fluid vector information generation unit 264 acquires the wind speed information (fluid speed information) which represents the speed of the flow of the wind in the virtual space, and the vibration control unit 266 vibrates a first vibration module 153 (first vibration element) and can thereafter vibrate a second vibration module 153 (second vibration element) spaced apart from the first vibration module 153 with the time difference corresponding to the wind speed information. Thus, the VR device 20 can cause the user to experience a situation where the wind blows against the finger in the windward earlier than the finger in the leeward in the virtual space.

Note that the present invention is not limited to the above embodiment but can appropriately be changed without departing from the scope of the gist thereof. For example, as a wearable device, instead of the finger cot 15, a device may be used which is wearable by being wound around an arbitrary body part such as another part of the hand, an arm, a neck, a torso, or a foot. In this case, similarly to the finger cot 15, a plurality of tactile sensation sensors, each of which has the vibration module 153 and the electric heating module 154 as a set, are provided in a circumferential direction in which the device is wound.

Not a plurality of sets of vibration modules 153 and electric heating modules 154 but only one set of those may be provided in the finger cot 15 (or another wearable device).

In the first embodiment, a description is made about the point that the tactile sensation of the user in a case where the wind (gas) in the virtual space blows against the finger of the user is generated, but a device according to the present invention is not limited to this, and a tactile sensation in a case where the user touches a liquid such as water can similarly be generated. As for a liquid, the fluid vector information generation unit 264 may acquire the fluid direction information which represents a direction of a flow of a fluid flowing in the virtual space and the fluid speed information which represents a speed of the flow of the fluid, the fluid direction information and the fluid speed information being stored in the DB 21, as the velocity vector (fluid vector) information about the flow in the virtual space. In this case, the comparison unit 265 first determines whether or not the fluid contacts with the finger cot 15, and in a case where the fluid contacts with the finger cot 15, based on the posture of the finger, the comparison unit 265 detects each of the sets of tactile sensation sensors is hit by the fluid in which direction and at which speed. Accordingly, the vibration control unit 266 and the temperature control unit 267 can perform control processes which provide the tactile sensation corresponding to the velocity vector of the fluid for the user.

Note that the DB 21 may store data about viscosity or the like of the liquid. The vibration control unit 266 uses the data about the viscosity and may thereby further adjust the vibration of the vibration module 153 such that the user can experience the tactile sensation of the viscosity of the liquid. Further, similarly to the control about the atmospheric temperature in the virtual space which is described in the first embodiment, based on temperature settings of the liquid itself, the temperature control unit 267 may further adjust the temperature of the electric heating module 154 such that the user can experience the temperature of the liquid. In such a manner, the device according to the present invention can generate a tactile sensation of an arbitrary fluid including gas and liquid.

As described above, one or a plurality of processors provided in the VR system in the above-described embodiment execute one or a plurality of programs including a command group for causing a computer to perform an algorithm which is described with reference to the drawings. By this process, the process described in each embodiment can be realized.

The program includes a command group (or a software code) for causing a computer to perform one or more functions described in the embodiment in a case where the program is read by the computer. The program may be stored in a non-transitory computer-readable medium or a tangible storage medium. By way of example and not of limitation, the computer-readable medium or the tangible storage medium includes a random-access memory (RAM), a read-only memory (ROM), a flash memory, a solid-state drive (SSD), or another memory technique, a CD-ROM, a digital versatile disk (DVD), a Blu-ray® disk, or another optical disk storage, or a magnetic cassette, a magnetic tape, a magnetic disk storage, or another magnetic storage device. The program may be transmitted through a transitory computer-readable medium or a communication medium. By way of example and not of limitation, the transitory computer-readable medium or the communication medium includes an electric, optical, acoustic, or other type of propagation signal. Further, the program can take a form of an application, for example.

In the foregoing, the present invention has been described with reference to the embodiment, but the present invention is not limited by the above descriptions. As for configurations and details of the present invention, various changes which can be understood by persons skilled in the art can be made within the scope of the present invention.

The present embodiment can provide a tactile sensation generation device, a tactile sensation generation method, and a program which enable a user to recognize a fluid in a virtual space as being closer to a fluid in reality.

INDUSTRIAL APPLICABILITY

The present invention is usable for a tactile sensation generation device and so forth which enables a user to experience a tactile sensation of a fluid in a virtual space.

What is claimed is:

1. A tactile sensation generation device comprising:

a posture information generation unit configured to generate posture information representing a posture of a wearing part of a wearer of a vibration element;

a fluid direction information acquisition unit configured to acquire fluid direction information representing a direction of a flow of a fluid in a virtual space and fluid speed information representing a speed of the flow of the fluid in the virtual space;

a comparison unit configured to compare the posture information of the wearing part with the fluid direction information; and a vibration control unit configured to control vibration of the vibration element based on a result of a comparison by the comparison unit, wherein, after the vibration control unit calculates a time difference based on the fluid speed information and vibrates a first vibration element, the vibration control unit vibrates a second vibration element, which is spaced apart from the first vibration element, with the time difference, wherein the posture information generation unit acquires a velocity vector of the vibration element, and wherein the comparison unit compares the fluid direction information and the fluid speed information with the velocity vector of the vibration element.

2. The tactile sensation generation device according to claim 1, wherein the vibration control unit calculates the time difference based on a distance between the first vibration element and the second vibration element and the fluid speed information.

3. A tactile sensation generation method being executed by a tactile sensation generation device, the tactile sensation generation method comprising:

a posture information generation step of generating posture information representing a posture of a wearing part of a wearer of a vibration element;

a fluid direction information acquisition step of acquiring fluid direction information representing a direction of a flow of a fluid in a virtual space and fluid speed information representing a speed of the flow of the fluid in the virtual space;

a comparison step of comparing the posture information of the wearing part with the fluid direction information; and a vibration control step of controlling vibration of the vibration element based on a result of a comparison, wherein, in the vibration control step, after a time difference is calculated based on the fluid speed information and a first vibration element is vibrated, a second vibration element, which is spaced apart from the first vibration element, is vibrated with the time difference, wherein the posture information generation step includes acquiring a velocity vector of the vibration element, and wherein the comparison step comprises comparing the fluid direction information and the fluid speed information with the velocity vector of the vibration element.

4. A non-transitory computer-readable medium storing a program, the program causing a computer to execute a method, the method including:

a posture information generation step of generating posture information representing a posture of a wearing part of a wearer of a vibration element;

a fluid direction information acquisition step of acquiring fluid direction information representing a direction of a flow of a fluid in a virtual space and fluid speed information representing a speed of the flow of the fluid in the virtual space;

a comparison step of comparing the posture information of the wearing part with the fluid direction information; and a vibration control step of controlling vibration of the vibration element based on a result of a comparison, wherein in the vibration control step, after a time difference is calculated based on the fluid speed information and a first vibration element is vibrated, a second vibration element, which is spaced apart from the first vibration element, is vibrated with the time difference, wherein the posture information generation step includes acquiring a velocity vector of the vibration element, and wherein the comparison step comprises comparing the fluid direction information and the fluid speed information with the velocity vector of the vibration element.

* * * * *